Sept. 23, 1958 B. E. DENTON 2,853,549

HIGH LEVEL CONTRAST CONTROL FOR VIDEO AMPLIFIERS

Filed March 30, 1951

INVENTOR
Bethel E. Denton
ATTORNEY

United States Patent Office 2,853,549
Patented Sept. 23, 1958

2,853,549

HIGH LEVEL CONTRAST CONTROL FOR VIDEO AMPLIFIERS

Bethel E. Denton, Merchantville, N. J., assignor to Radio Corporation of America, a corporation of Delaware Application March 30, 1951, Serial No. 218,310

5 Claims. (Cl. 178—7.5)

This invention relates to video circuits for television receivers and more particularly it relates to contrast control means for varying the output signal level from video amplifiers.

In order to take full advantage of the video circuit amplification, it is desirable to take the synchronizing signal from a high level video source such as may be found in the plate circuit of the final video amplifier stage. However, since contrast control means is necessary at some point in the video amplifier, the amplified synchronizing pulse will vary in amplitude as the contrast control is varied. For this reason the synchronization signal was of necessity taken from the circuit at some point preceding the video amplifier stage.

In accordance with the present invention there is employed a video contrast control comprising a variable attenuator in the plate circuit of the final video amplifier stage taking off the desired level of video signal from across the attenuator network. The network is designed and connected to provide the desired synchronization signal of constant high amplitude suitable for application to the synchronizing separator circuits without additional amplification.

There are, however, problems introduced by such high level contrast control circuits which have prevented the circuits from coming into extensive use in the past.

The picture tube or other video output circuit may cause video frequency distortion by an inherent amount of capacity loading at the video output circuit, thus shunting high frequency video signals to ground. As the output tap is changed, this capacity loading represents a different proportion of the output signal impedance, and will cause a greater loss in the high frequencies at positions other than maximum contrast level. In accordance with this invention a video compensation network is provided to cause the effective impedance ratio of the output circuit to be essentially constant for both high and low frequency video signals.

In addition, as the contrast level is varied, a constant direct current blanking level must be maintained in order that background level will remain constant and retrace lines will not appear. In accordance with this invention there is provided means for keeping the blanking pulse pedestal at an essentially constant direct current level for all contrast control settings, so that proper blanking of the kinescope may be obtained.

It will be seen therefore that in accordance with the teachings of this invention high level synchronization signals may be provided from the video amplifier, affording a simplified, as well as improved synchronization system. There is also provided an improved video amplifier circuit, with high level contrast control effecting good video frequency response and proper blanking.

It is therefore a general object of the invention to take advantage of the video amplifier circuits for the amplification of synchronizing pulses.

It is a further object of the invention to provide a video amplifier output circuit of such a nature that synchronization signals may be obtained from a high level video source whose amplitude is independent of the contrast control setting.

It is another object of the invention to provide a video amplifier system having high level contrast control operable without decreasing the video frequency response at the picture tube upon selection of low contrast levels.

It is a still further object of the invention to provide improved video amplifier circuits with high level contrast control, which afford good video frequency response and high amplitude synchronizing output signals of constant level regardless of the contrast control setting.

Other and incidental objects of the invention will be apparent to those skilled in the art from a reading of the following specification and an inspection of the accompanying drawings in which.

Figure 1:
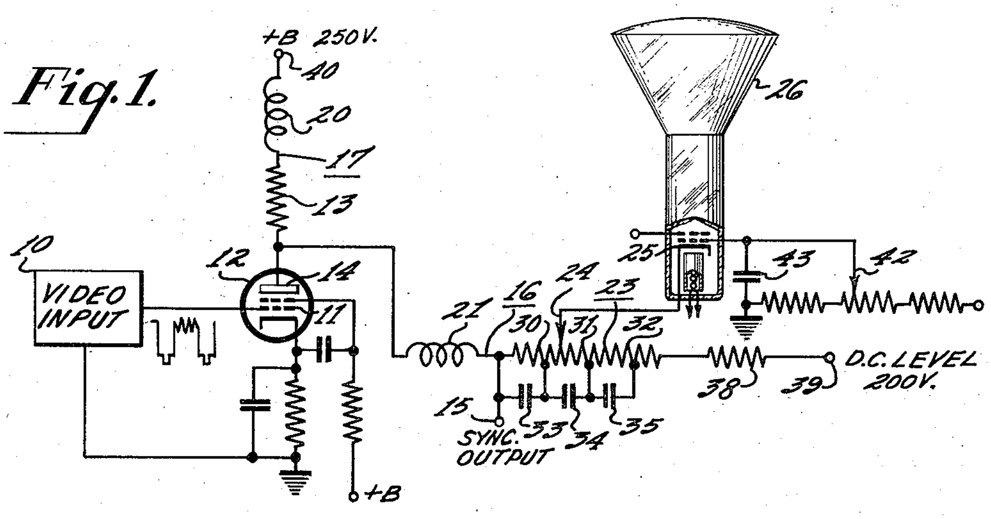
Figure 1 is a schematic circuit diagram of the invention in one of its forms.

Referring now in particular to the drawing, like reference characters designate similar component parts throughout respective views. In particular, referring to the schematic circuit of Figure 1, a block 10 represents a conventional video input circuit, such as may be found in the prior art. See for example RCA Review for March 1947 wherein a popular home television receiver is shown and described. This input circuit 10 provides at the grid 11 of a final video amplifier tube 12, a video signal of essentially constant amplitude and with sync of positive polarity. In general the amplitude is maintained at an essentially constant value by automatic gain control circuits but the invention need not be restricted to any such types of input circuits. Automatic gain control circuits for television are well shown and described in an article entitled "Automatic gain controls for television receivers" by K. R. Wendt and A. C. Schroeder in RCA Review for September 1948.

With an essentially constant input signal level, the output composite video signal at the anode 14 of the final video amplifier tube 12 will remain at an essentially constant amplitude. Thus, the synchronizing voltage at the synchronization output terminal 15 will have the desirable characteristics necessary for improved synchronization separation, as hereinbefore described.

The video amplifier tube 12 is provided with an output circuit including a pair of output impedance branches 16 and 17 with direct voltage supply terminals 39 and 40 connected respectively to each branch. A video peaking network comprising coils 20 and 21 is provided in each branch for obtaining the desired video frequency signal band pass characteristic. One branch 16 contains a video output resistor or potentiometer 23 of fixed value having an adjustable output tap 24. By this tap a variable portion of the output video signal developed across the resistor 23 may be coupled to the cathode 25 of a kinescope 26.

Since the output resistor 23 is always connected in entirety in the output circuit of the video amplifier tube 12, regardless of the setting of the output tap 24, the synchronization output signal at terminal 15 will not be appreciably changed for different contrast control settings, as would be the case should the contrast control setting be positioned in an earlier video circuit portion. Therefore, the full gain of each video amplifier stage may be realized with respect to the synchronization signal before taking an output signal from the final video amplifier for the operation of a synchronization separation circuit.

High level contrast control means have not been used in the prior art extensively because the video frequency response at other than maximum contrast control settings is poor without the provision of special compensating networks. In accordance with this invention, however, good video frequency response is obtained with a simplified video compensating network connected between a plurality of fixed taps on the output resistor 23 defining relatively low resistance portions 30, 31 and 32, or the like.

The video compensation network in this embodiment consists of small fixed capacitors 33, 34 and 35, which are connected across the low resistance portions 30, 31 and 32. Each capacitor has a capacitive reactance component such that the effective impedance ratio of the output circuit on opposite sides of the settings of the adjustable output tap 24 is essentially constant for both high and low frequency video signals. Actually, this desired impedance ratio is only an approximation unless the variable resistor tap is placed exactly at the fixed tap position, when a discrete number of tapped sections is provided. However, in practice the resulting output video frequency response will be greatly improved and will effectively provide a satisfactory impedance ratio for each contrast control setting.

The capacitors 33, 34 and 35 are chosen such that for the higher video frequencies, when the capacity loading between the variable tap 24 and ground would normally cause some of the high video frequency kinescope signal to be lost at other than maximum contrast control settings, the capacitive impedance ratio upon each side of the adjustable tap is effectively equal to the resistance ratio upon each side of the variable tap 24. At the low video frequencies the capacitors have such high impedance as to be negligible, and effectively the load will be resistive. At low frequencies therefore the ratio of resistance upon each side of the output resistor tap will determine the output signal level.

The variably adjustable output tap 24 controls the picture contrast, even at low contrast settings, without appreciably affecting the video frequency response characteristic. In general, the overall video amplifier response at the sync output terminal 15 is not largely affected by these small capacitors since they are effectively in series and therefore represent a high impedance. If the impedance is lower than desired or is not negligible in the design of some circuits, however the peaking coil 21 may be made to compensate for any tendency to limit the high frequency video response characteristic caused by the small amount of effective capacity.

Figures 2, 3, 4, 5:
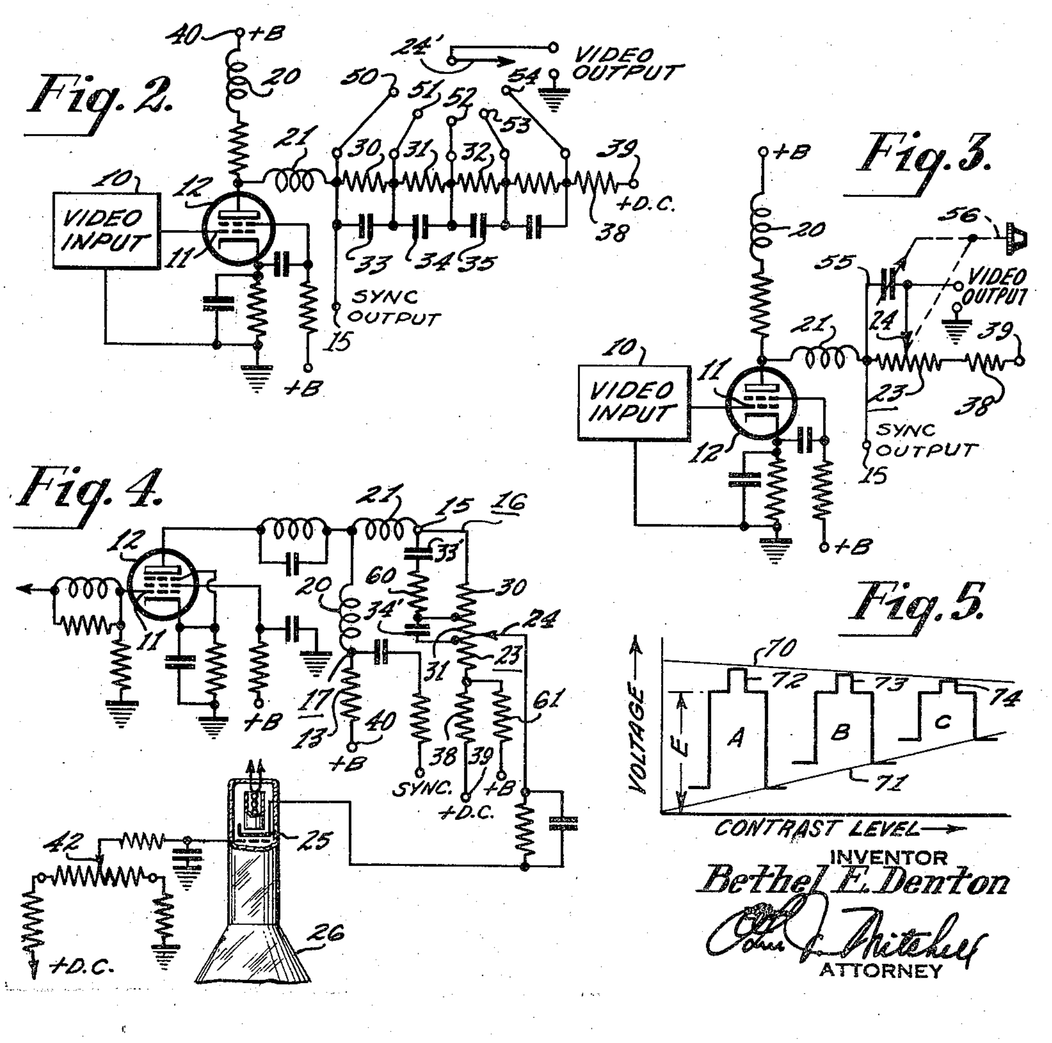
Figures 2, 3 and 4 are schematic circuit diagrams of further embodiments of the invention; and, Figure 5 is a graphical representation of video waveforms at the kinescope illustrating constant level kinescope blanking as provided for in the present invention.

A fixed resistor 38 is serially connected with the tapped output resistor 23 in the output impedance branch 16, and is proportioned in value so as to fix the minimum output level at the low end of the contrast control setting and determine the range through which the contrast may be varied. Connected to this resistor 38 is a direct (D.-C.) voltage supply terminal 39 which is kept at a D.-C. level generally smaller than the +B level connected to the video amplifier tube at terminal 40 by means of the other output impedance branch 17. This D.-C. level at terminal 39 is selected in accordance with a further phase of the invention to have a value, as compared to the direct voltage at terminal 40, such that the direct current voltage gradients across the output resistors 23 and 38 are so proportioned to the signal voltage gradient that the top of the television synchronizing signal blanking pedestals, as appearing at the tap 24, remain at an essentially constant direct current voltage level for each setting of the contrast control. This feature is shown by the waveforms of Figure 5.

Thus, in accordance with the invention, proper blanking operation of the kinescope 26 is obtained even though the actual video frequency output level is changed throughout large ranges. This feature of the invention will be discussed in more detail hereinafter in connection with the description of the graph of Figure 5.

A conventional brightness control adjustment 42 is provided in the direct current grid return path of the kinescope 26, and capacitor 43 is connected to ground from the brightness control to establish the kinescope grid at signal ground.

It is clear from the consideration of the invention as exemplified by Figure 1 that there is provided a video amplifier circuit having many advantages including a higher level constant amplitude video signal for better synchronization pulse separation, improved kinescope blanking and better video frequency response.

As shown in Figure 2, contrast control settings may be made by means of a multi-position switch contrast control selector 24'. This has the advantage that each tap position 50 to 54 may be separately compensated to maintain almost perfect frequency response characteristics for each tap setting. That is, there is no approximation of the type occasioned when the adjustable output tap 24 of Figure 1 is placed in a position intermediate the fixed taps.

Another embodiment having excellent frequency response is shown in Figure 3 wherein a variable capacitor 55 is provided. This variable capacitor is provided with its capacity reactance effectively connected between the adjustable output tap 24 and the high video potential end of the output resistor 23. Variable control means 56 is provided for conjointly varying the contrast control tap position and the value of capacitor 55. Capacitor 55 is so designed that its capacity is varied to maintain the effective impedance ratio of the output circuit on opposite sides of the adjustable output tap 24 essentially constant for both high and low frequency video signals.

Although the variable capacitor of Figure 3 is desirable from the video frequency response viewpoint, in commercial production such a device would be expensive. Therefore a compromise may be made, so that improved high fidelity video frequency response may be obtained at the lowest possible cost. A commercial embodiment of the invention, so designed, is shown schematically in Figure 4. This circuit is in general similar to that of Figure 1. However, the synchronization output signal is taken from the output impedance branch 17 at the junction of resistor 13 and the peaking coil 20, rather than from the terminal 15 in the output impedance branch 16. In either case the synchronization signal is effectively taken from the high potential end of the output resistor 23.

For effecting improved frequency response, capacitors 33' and 34' are connected across the low resistance portions 30 and 31 of the output resistor 23. The portion of the video compensating network connected across the resistance section 30 includes a resistor 60 in series with capacitor 33'. This combination is provided to obtain the proper output circuit impedance ratio upon each side of the tap 24. In general, however, the video compensating network may consist of a plurality of capacitors connected across, or in shunt with, portions of the output resistor 23.

A resistor 61 is connected to the junction of the output resistors 23 and 38. This is provided so that the proper D. C. level may be maintained from the anode supply while at the same time both the load impedance of branch 16 and the contrast control range is selected at the proper value. It is noted that the effective series resistance is that of resistors 38 and 61 in shunt, and the contrast control range, as determined by the setting of the variable output resistor tap 24, is determined by the ratio of the effective series resistance with the resistance of output resistor 23.

As hereinbefore explained, in order to obtain proper blanking and constant background setting of the kinescope 26 with different contrast control settings, the D. C. level at terminal 39 should be selected to provide a direct current voltage gradient across the output resistors 23 and 38, which is proportional to the signal voltage gradient across the same resistors. Stated another way, the values of the output circuit elements are selected to provide inverse complementary D. C. and video signal A. C. voltage gradients across the potentiometer resistor 23 so that the blanking level of the video signal taken from the tap 24 is substantially constant at all positions of the tap.

In Figure 5 the blanking pulse with synchronization pulses superimposed is shown for three settings of the contrast control, "A," "B" and "C." The video signal level or video signal voltage gradient for different contrast control settings is determined by the differences in amplitudes between the lines 70 and 71. When the D. C. level at terminal 39 is properly set the D. C. gradient is so proportioned that it adds to the D. C. axis of the waveform to maintain the top of each blanking pedestal at a constant D. C. voltage value "E," for all contrast control settings. Thus, the background lighting determined by the setting of the brightness control 42 (Figs. 1 and 4) will be constant for any setting of the contrast control. Should this direct current level not be properly set the brightness of the background setting will change with different contrast settings and retrace lines may show.

Thus the present invention has provided a final video amplifier stage for a television receiver suitable for amplification of synchronizing signals as well as video signals without interfering with the quality or control of the video signals.

What is claimed is:

1. In a television receiver, the combination of: a circuit ground means to which the elements of said receiver are electrically referenced; a source of demodulated video signals containing high and low frequency components; a video signal output amplifier having an input circuit and an output circuit, said input circuit being operatively connected with said signal source so that amplified video signals are developed in said output circuit, said output circuit having means defining an output terminal at which appears amplified video signals referenced to said ground means, said output terminal defining means further establishing said output terminal at a substantial impedance level above said ground means; an image display apparatus having a video signal input terminal sustaining a substantial capacitive impedance with respect to said circuit ground means; a resistor having a first and a second extremities with a plurality of fixed taps therebetween; additional means operatively connected with said resistor for manually selecting various positions along said resistor between said extremities; means operatively coupling the first extremity of said resistor with said output terminal; means operatively coupling the second extremity of said resistor with said circuit ground means such that video signal appears across said resistor; means operatively coupling said image display apparatus input terminal with said selecting means so that manual adjustment of the amplitude of signal applied to the input terminal of said image display apparatus may be effectuated, said adjustment resulting in unwanted changes in the balance between high and low frequency video signal components delivered to said display apparatus due to the high frequency shunting effect of said image display apparatus input terminal impedance; and capacitance means connected between at least two of said fixed taps, the value of said capacitance means being so valued relative to the value of said image display apparatus input terminal impedance and the resistance defined by the said fixed taps as to counter the high frequency shunting effect of said image display apparatus input impedance to minimize said unwanted changes in said high and low frequency balance.

2. Apparatus according to claim 1 wherein a fixed resistance is connected between said second extremity of said resistor and said circuit ground means, the value of said fixed resistor being such to substantially restrict the range of video signal amplitude adjustment provided by manual adjustment of said selecting means.

3. Apparatus according to claim 2 wherein means are operatively included in said video signal source for establishing a direct current component in said demodulated video signal, said direct current component depicting picture brightness information, means included in said amplifier causing said amplifier to amplify direct current signal information so that amplified direct current information appears at said output terminal defining means; means included in said coupling means for said resistor extremities translating direct current signal information from said output terminal defining means to said resistor so that the video signal appearing across said resistor contains a direct current component referenced to circuit ground; means included in said manual selecting means for communicating direct current signal information; means included in said image display apparatus input terminal coupling means for communicating direct current signal information to said image display apparatus and direct current voltage supply means connected in series with said resistor to establish therethrough a direct current flow of a magnitude producing a direct current voltage gradient across said resistor of a magnitude substantially equal to the alternating current voltage gradient across said resistor so that the direct current potential appearing at said image display apparatus input terminal corresponding to a predetermined image brightness level remains substantially independent of the manual adjustment of said selecting means.

4. In a television receiver or the like, the combination of, a source of a video signal having synchronizing pulses on blanking pedestals between each line of picture information, a video amplifier device having an output terminal, a synchronizing signal output circuit for said amplifier device including a first source of biasing potential and an output impedance coupled between said output terminal and said first source of biasing potential, a video signal output circuit for said amplifier including a second source of biasing potential and a potentiometer coupled between said output terminal and said second source of biasing potential, an image reproducing device having a video input terminal, a manually movable tap on said potentiometer direct-current coupled to the input terminal of said image reproducing device to provide a contrast control, and at least one capacitor coupled across a portion of said potentiometer to compensate for changes in capacitive loading of the video signal at different positions of said potentiometer contrast control tap, the elements of said synchronizing signal output circuit and said video signal output circuit having values selected to provide inverse complementary direct-current and video signal alternating-current voltage gradients across said potentiometer so that the blanking level of the video signal taken from the tap on said contrast control potentiometer is substantially constant at all positions of said tap.

5. In a television receiver or the like, the combination of a source of a video signal having synchronizing pulses on blanking pedestals between each line of picture information, a video output amplifier device and an output circuit therefor having first and second branches, means to derive synchronizing pulses from said first branch, said second branch comprising a source of biasing potential and serially connected resistors coupled between said amplifier device and said source of potential, a plurality of capacitors shunting portions of one of said resistors, an image reproducing device, a manually movable tap on said one resistor, means providing a direct current path from said tap to a video input terminal of said image reproducing device, said movable tap constituting a contrast control for controlling the amplitude of video signal coupled to said image reproducing device, said capacitors and resistors having values so that the frequency response of video signals obtained from said second branch and the level of synchronizing pulses obtained from said first branch are substantially independent of the position of said contrast control, said resistors and said source of biasing potential having values selected to provide inverse complementary direct current and video signal alternating current voltage gradients across said potentiometer so that the blanking level of the video signal taken from the tap on said contrast control potentiometer is substantially constant at all positions of said tap.

References Cited in the file of this patent

UNITED STATES PATENTS

| | | |
|---|---|---|
| 2,234,830 | Norton | Mar. 11, 1941 |
| 2,236,066 | Poch | Mar. 25, 1941 |
| 2,448,771 | Christaldi | Sept. 7, 1948 |
| 2,505,367 | Shaw | Apr. 25, 1950 |
| 2,540,646 | Bernard | Feb. 6, 1951 |
| 2,552,022 | Watson et al. | May 8, 1951 |
| 2,584,332 | Crooker et al. | Feb. 5, 1952 |
| 2,656,413 | Faudell | Oct. 20, 1953 |
| 2,718,551 | Gray | Sept. 20, 1955 |

FOREIGN PATENTS

| | | |
|---|---|---|
| 246,035 | Switzerland | Aug. 16, 1947 |

OTHER REFERENCES

Rider's Television Manual, vol. 6, TV pages 6–11, Zenith (model H2437E).